US00RE35936E

United States Patent [19]

DiRisio et al.

[11] E Patent Number: Re. 35,936

[45] Reissued Date of Patent: Oct. 27, 1998

[54] VISUAL EXPOSURE INDICATING SYSTEM

[75] Inventors: Anthony DiRisio, Rochester; Edgar Gene Earnhart, Hilton; Michael Thomas Wolf, Rochester, all of N.Y.

[73] Assignee: Eastman Kodak Company, Rochester, N.Y.

[21] Appl. No.: 908,423

[22] Filed: Aug. 7, 1997

Related U.S. Patent Documents

Reissue of:

[64] Patent No.: 5,552,849
Issued: Sep. 3, 1996
Appl. No.: 377,542
Filed: Jan. 23, 1995

[51] Int. Cl.[6] ..... G03B 17/26

[52] U.S. Cl. ..... 396/515; 396/284; 396/538

[58] Field of Search ..... 396/284, 515, 396/516, 538; 242/348, 912

[56] References Cited

U.S. PATENT DOCUMENTS

| | | | |
|---|---|---|---|
| 4,978,985 | 12/1990 | Smart et al. . | |
| 5,021,816 | 6/1991 | Pagano et al. . | |
| 5,079,579 | 1/1992 | Pagano et al. . | |
| 5,115,268 | 5/1992 | Kitagawa et al. . | |
| 5,159,365 | 10/1992 | Takahashi et al. | 396/285 |
| 5,278,600 | 1/1994 | Takahashi et al. . | |
| 5,463,435 | 10/1995 | Ezawa . | |
| 5,475,454 | 12/1995 | Ezawa . | |

FOREIGN PATENT DOCUMENTS

| | | |
|---|---|---|
| 0 431 529 | 6/1991 | European Pat. Off. . |
| 0 441 662 | 8/1991 | European Pat. Off. . |
| 0 467 644 | 1/1992 | European Pat. Off. . |

*Primary Examiner*—A. A. Mathews
*Attorney, Agent, or Firm*—Peter J. Bilinski

[57] ABSTRACT

A film cassette includes a cassette body, a film spool onto which can be wound a strip of film drive disk coupled directly to the film spool, and an indicator flex disk that includes a film status indicator tab whose position relative to a window of the film cassette indicates the film exposure status. The position of the film status indicator tab is changed when the flex disk is moved into engagement with the drive disk and the film spool is rotated upon film movement. The film status indicator tab otherwise does not engage the drive disk and therefore does not change position. The cassette is particularly suited for operation with a photographic camera that includes a camera body, a loading chamber in the camera body that receives the film cassette, and a loading chamber cover having at least one movable indicator release pin that moves the flex disk into and out of engagement with the drive disk and thereby changes the position of the film status indicator tab. A camera controller determines the film status and controls the movement of the indicator release pin to selectively change the position of the film status indicator tab in accordance with the film status.

32 Claims, 8 Drawing Sheets

VISUAL EXPOSURE INDICATING SYSTEM

Matter enclosed in heavy brackets [ ] appears in the original patent but forms no part of this reissue specification; matter printed in italics indicates the additions made by reissue.

*This application is a reissue application of U.S. Pat. No. 5,552,849, issued on Sep. 3 1996, based on U.S. Ser. No. 08/377,542, filed Jan. 23, 1995.*

BACKGROUND OF THE INVENTION

1. Field of the Invention

This invention relates generally to systems that indicate the exposure status of photographic film and, more particularly, to camera and film cassette systems that cooperate to visually indicate the exposure status of the film cassette.

2. Description of the Related Art

Photographic cameras typically accept roll strips of photographic film that are exposed one frame at a time. Many cameras are designed to accept rolls of film that are enclosed within a light-tight film container such as a cassette or a canister. A typical container is the familiar 35 mm format film. After the film container is received within the camera, the film is pulled out of the container and stretched across an exposure gate, where frames are exposed in sequence, one after the other. It can be desirable to interrupt the sequential exposure of frames of the film in mid-roll so that a camera user can rewind a partially exposed roll of film back into the light-tight container, remove the container from the camera, and temporarily store the container. At a later time, the camera user can reload the interrupted container back into the camera and then position the film at approximately the next unexposed frame location, ready to resume picture taking.

The mid-roll interrupt (MRI) operation has many advantages, primarily where a roll of film will not be completely exposed before it is desirable to load a new roll of film. For example, by removing a film strip in mid-roll, it is possible to maintain the same subject matter for an entire roll of exposures taken over time without discarding unexposed frames as the camera user changes to a new roll and a new photographic subject. The MRI feature also permits changing among different film types during a continuous picture taking session without discarding large portions of unexposed film, such as might be desirable under changing light conditions.

Some cameras provide an automatic mid-roll interrupt (MRI) function in which a partially exposed roll of film is automatically rewound into the film container when the MRI function is invoked and is automatically positioned at the next unexposed frame location upon being reloaded into the camera. Film cassettes designed for use with automatic MRI-capable cameras often include relatively complex mechanisms to ensure the cassette remains light-tight, and often include a film parking mechanism that prevents the roll strip of film from unravelling or unspooling within the cassette. Any unspooling of the film would make it very difficult to resume making exposures at the correct frame position. Film parking mechanisms can be relatively complex, having mechanisms for locking the spool and for positioning light-tight film cassette doors, and can require complex camera-cassette mechanical interfaces.

One problem that can be encountered with mid-roll interrupt operations is that an already-exposed roll of film can be inadvertently loaded and exposed once again, creating double images and mining the film. Therefore, film cassettes intended for use in conjunction with mid-roll interrupt operation also typically include a visual indication of the film status. In this way, a user is immediately informed of the film cassette status and does not attempt to load a cassette containing film that was already exposed or processed. Typically, the visual indication provided by such cassettes distinguishes the film status as being either unexposed, partially exposed, fully exposed, or processed.

As noted above, the mechanical interfaces between an MRI-capable camera and a film cassette can be relatively complex and costly. Both the mechanical interface and the film cassette design can be even more complex and costly if operation with both MRI and non-MRI cameras is to be supported and the visual exposure indication is to be provided For example, if a film cassette is to be compatible with non-MRI cameras, then the camera-film cassette combination must automatically omit any visual indication of the film being partially exposed, as that would be a non-operational mode.

From the discussion above, it should be apparent that there is a need for a photographic camera and film cassette combination that provides the convenience and flexibility of the MRI feature and also provides dual operation such that MRI and non-MRI cameras can be operated with MRI and non-MRI film cassettes, without the complexity and cost associated with conventional camera-cassette combinations. The present invention fulfills this need.

SUMMARY OF THE INVENTION

In accordance with the present invention, a film cassette includes a cassette body, a film spool onto which can be wound a strip of film, a drive disk coupled directly to the film spool, and an indicator flex disk that includes a film status indicator whose position relative to a window of the film cassette indicates the film exposure status. The flex disk is moved into engagement with the drive disk to change the position of the film status indicator when the film spool is rotated upon film movement, thereby changing the indicated film exposure status. The flex disk otherwise is not engaged with the drive disk, thereby maintaining the position of the film status indicator in its current position even when the film spool is rotated. In this way, changing the state of the film exposure status indicator is a function of moving the flex disk into and out of engagement with the drive disk during film spool movement.

The cassette is particularly suited for operation with a photographic camera that includes a camera body, a loading chamber in the camera body that receives the film cassette, and a loading chamber cover having at least one indicator release that moves the flex disk into and out of engagement with the drive disk and thereby changes the status of the film status indicator. A controller determines the film status and controls the movement of the indicator release to selectively change the position of the film status indicator in accordance with the film status. In a non-MRI camera, the indicator release does not permit selection of a film status indicator position that would falsely indicate a partially exposed roll of film. In an MRI-capable camera, the release indicator permits selection of any one of the appropriate film status indicators. Thus, the exposure status of the film is readily perceived, without need for complicated film park mechanisms, and the film cassette can be used with both MRI capable cameras and non-MRI cameras.

Other features and advantages of the present invention should be apparent from the following description of the preferred embodiments, which illustrate, by way of example, the principles of the invention.

DESCRIPTION OF THE PREFERRED EMBODIMENT

Figure 1:
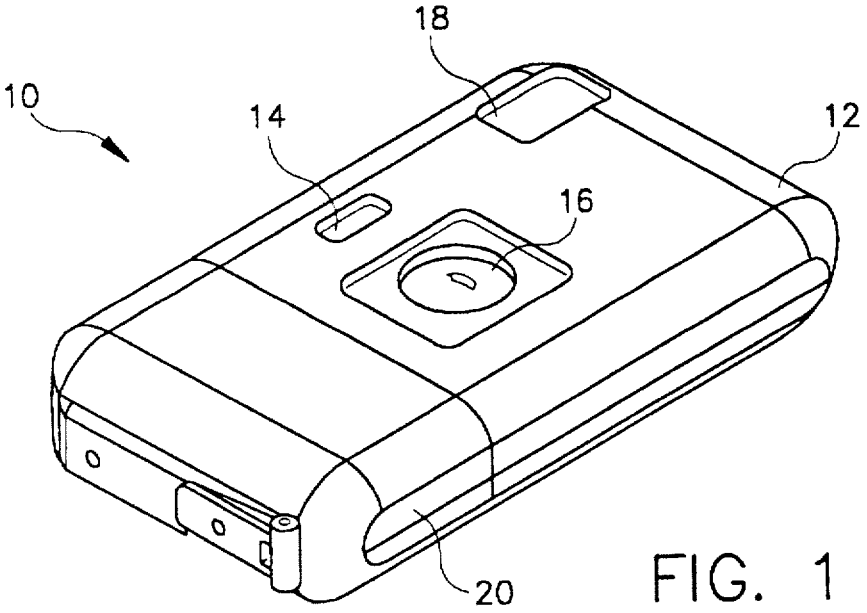
FIG. 1 is a perspective view of a camera constructed in accordance with the present invention in an operational orientation.
Figure 2:
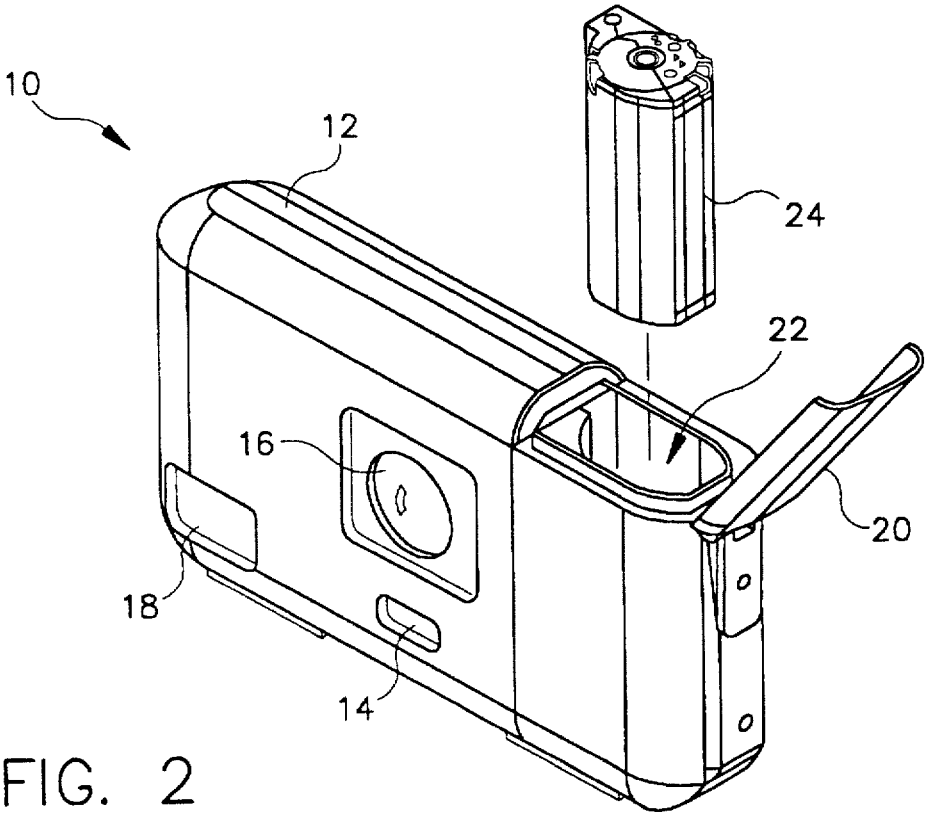
FIG. 2 is a perspective view of the camera illustrated in FIG. 1 and a film cassette constructed in accordance with the present invention with the camera in a film loading position.

FIGS. 1 and 2 show a camera/film cassette combination 10 constructed in accordance with the invention in which a camera 12 provides a mid-roll interrupt (MRI) feature. FIG. 1 is a frontal view that shows the camera in an operational orientation, ready for picture taking. A camera user views a scene through a viewfinder 14 and activates a shutter to permit ambient light to enter the camera through an objective lens 16. An electronic flash 18 provides supplemental illumination, if necessary for proper exposure. FIG. 2 shows the camera 12 inverted for film loading with a camera loading chamber cover 20 in an open condition to reveal a loading chamber 22 receiving a film cassette 24. The film cassette is shown more clearly in FIG. 3, which shows that an end plate 26 of the film cassette includes multiple film exposure status icons 28, each of which is located near an indicator notch 30, or window, of the end plate. An exposure status indicator tab 32 carried within the film cassette provides a visual exposure indicator (VEI) by moving to a particular one of the indicator notches 30.

In particular, the exposure status tab 32 is sized such that it can be urged into any one of the indicator windows 30, engaging the window and locking the tab in the window, and also can be urged out of engagement. The tab indicates the film status as corresponding to the status icon 28 adjacent to the indicator window with which the tab is engaged. Photographic film is wound onto a spool 34 carried within the cassette 24. As described more fully below, engagement of the tab 32 with the windows is controlled such that the tab moves with the spool when the indicated film status is to be changed and otherwise remains fixed while the spool rotates.

When the indicator tab 32 is engaged with one of the windows 30, movement of the film spool 34 causes no movement of the tab and therefore the film exposure status indicated by the tab does not change. To change the indicated film status, the tab must be pressed out of engagement with the window. Rotation of the film spool will then cause the tab to move to another window. Thus, the indicated film exposure status is determined by controlling the movement of the tab 32. In this way, complex film parking mechanisms are not needed to indicate the proper exposure status of the film.

Figure 3:
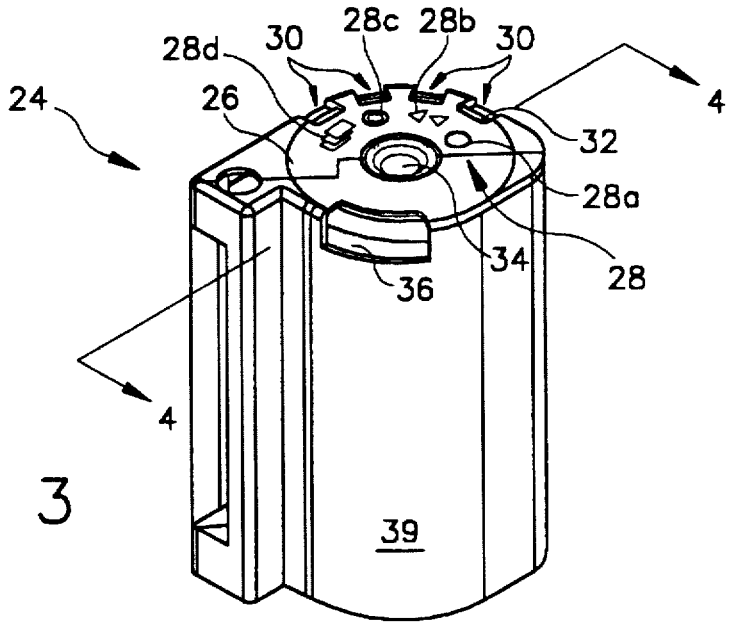
FIG. 3 is a perspective view of the film cassette illustrated in FIG. 2.

In the preferred embodiment illustrated in FIG. 3, the film exposure status icons 28 include an "unexposed" icon 28a that indicates the cassette contains a fresh, unused roll of film, a "partially exposed" icon 28b, used with MRI cameras, that indicates one or more frames of the film have been exposed and other frames remain unexposed, a "fully exposed" icon 28c that indicates all frames of the film have been exposed, and a "processed" icon 28d that indicates the film in the cassette has been exposed and processed. In the case of a processed cassette, it is intended that the processed film will remain in roll form within the cassette. Using such a scheme, a user who desires, for example, photographic prints from the roll will simply provide the processed cassette to a printer or photographic finsher, who will produce prints from designated frames of the film.

Movement of the exposure status indicating tab 32 can be controlled such that the film cassette 24 is compatible with cameras that are equipped with the MRI feature and also with those that are not so equipped In the case of a non-MRI camera, the window 30 associated with the "partially exposed" icon 28b will not be used. That is, the tab 32 is not permitted to engage with the end plate window adjacent the partially exposed icon 28c. In the preferred embodiment, the cassette includes a window 36 that provides a mechanical means of sensing the exposure status of the cassette. The mechanical status sensing means is not part of the visual exposure status system described herein.

Figure 4:
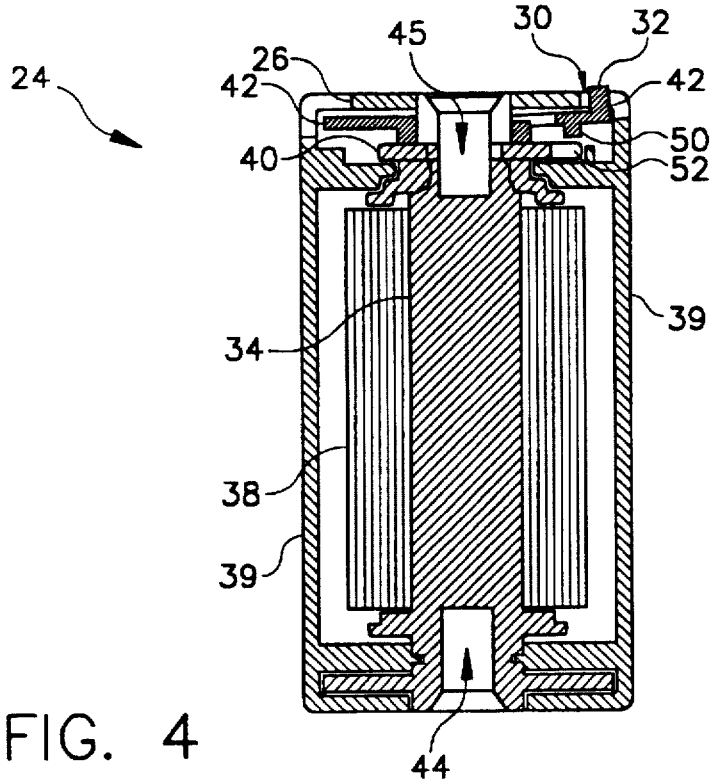
FIG. 4 is a cross-sectional view of the film cassette illustrated in FIG. 3.

Details of the cassette 24 construction are illustrated in the cross-section drawing of FIG. 4, which shows a length of photographic film 38 wound onto the film spool 34. FIG. 4 shows that the film spool is supported within the cassette body 39 and that a driver disk 40 is directly coupled to the film spool, thereby comprising an outwardly projecting flange of the spool. Located axially between the driver disk 40 and the cassette end plate 26 is a flex disk 42 that can be engaged and disengaged with the driver disk. One end of the film spool 34 comprises a drive socket 44 that receives a driving pin of the camera and the other end of the film spool comprises an idler socket 45. As described more completely below, the camera driving pin causes rotation of the film spool when the film is to be moved, which also rotates the driver disk 40. If the flex disk 42 is engaged with the driver disk 40 when the film spool moves, then the flex disk also rotates.

FIG. 4 illustrates that the indicator tab 32 projects outwardly from the flex disk toward the indicator windows 30 of the end plate 26. The indicator tab provides a visual exposure indication by engaging with one of the windows 30, thereby indicating the film status as corresponding to the associated film icon 28. More particularly, the flex disk 42 can rotate, and the indicator tab 32 can be moved to a different window, only when the indicator tab is pressed out of engagement. If the indicator tab extends into one of the windows, then the flex disk 42 will be held in a fixed position, even while the driver disk 40 and film spool 34 rotate.

Thus, the film cassette 24 is provided to a consumer with the indicator tab 32 positioned through the first window 30 adjacent the unexposed icon 28a. A camera designed to receive the film cassette includes a mechanism for depressing the indicator tab out of the first indicator window when the film is moved from the first exposure frame. In a non-MRI camera that does not provide the mid-roll interrupt feature, the indicator tab then is pressed out of engagement with the window for the unexposed icon 28a and is next permitted to enter the window corresponding to the fully exposed icon 28c.

In view of the cassette structure described above, either one of two tab changing schemes can be used. After the initial loading of the film cassette 24, an MRI camera permits the indicator tab 32 to enter the second indicating window, adjacent the partially exposed icon 28b. If the camera user invokes the MRI feature, then the film is rewound into the film cassette and engagement of the indicator tab 32 is controlled so there is no change in the position of the tab as the film is rewound. At the completion of rewinding, the camera user removes the film cassette, which properly indicates the partially exposed status.

Alternatively, after the initial loading of the film cassette 24, the MRI camera 12 can immediately permit the indicator tab 32 to enter the third indicating window corresponding to the fully exposed icon 28c. If the MRI feature is not invoked, then no change in the indicator tab position is necessary until the end of the film is reached. If the camera user invokes the MRI feature before the end of the film is reached, the camera controls engagement of the indicator tab 32 to permit the tab to move back as the film 38 is rewound into the film cassette and enter the second indicating window corresponding to the partially exposed icon 28b. Once again, when the user removes the film cassette from the camera the cassette will properly indicate the partially exposed status.

Whether or not the camera provides the MRI feature, after the entire film has been exposed, the indicator tab 32 is released from its window 30 and permitted to move with the last frame movement into the fully exposed icon window 28c so the film cassette will indicate the filly exposed status. As noted above, when the film is processed, the film processor will cause the indicator tab 32 to be moved into the window 30 for the processed icon 28d.

Figure 5:
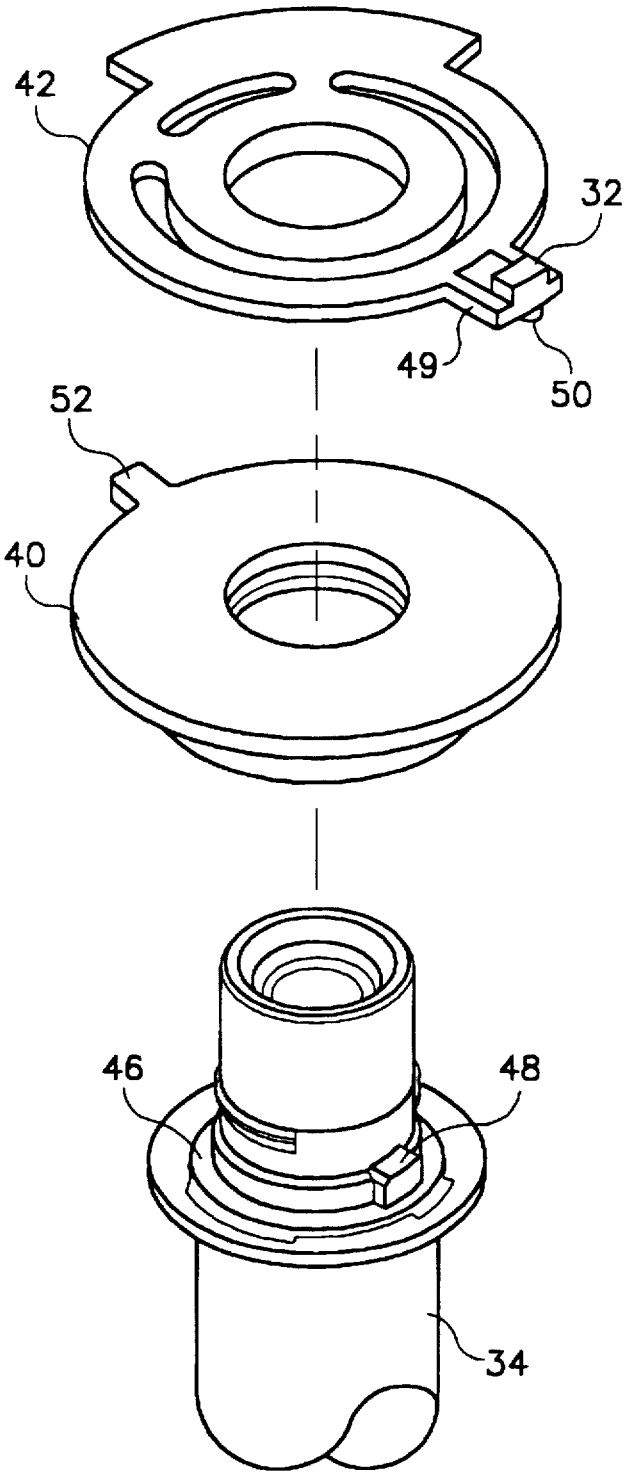
FIG. 5 is an exploded view of the flex disk, driver disk, and film spool of the film cassette illustrated in FIG. 3.

FIG. 5 is an exploded diagram that illustrates the relationship between the film spool 34, the driver disk 40, and the flex disk 42. FIG. 5 shows that the film spool has a ledge 46 that axially supports the driver disk 40. A locating key 48 that projects upwardly from the spool ledge engages the driver disk, which has a keyed bottom circumference that is adapted to engage with the locating key. The spool locating key and the driver disk cooperate to prevent relative movement between the driver disk and the film spool. FIG. 5 also shows that the flex disk 42 rests on the driver disk 40 and is axially supported thereon.

FIG. 5 shows that the indicator tab 32 is a projection from a substantially planar flex disk feature 49 that extends outwardly from the circumference of the flex disk sufficiently that the flex disk feature can be urged upwardly and downwardly relative to the plane of the flex disk. FIG. 5 also shows a drive pin 50 of the flex disk that comprises a projection from the flex disk feature 49 that extending downwardly away from the indicator tab 32. FIG. 5 further shows a driver feature 52 of the driver disk 40 that comprises a projection that extends outwardly from the circumference of the driver disk. Flexing of the flex disk feature 49 controls rotation of the flex disk by controlling engagement of the indicator tab 32 with the film status windows and contact between the drive pin 50 and the driver feature 52.

More particularly, if the indicator tab 32 is engaged in one of the film status windows 30 when the film spool 34 is rotated, then the drive pin 50 of the flex disk 42 is located away from the driver disk 40 with sufficient clearance so that the driver feature 52 passes by the drive pin as the driver disk rotates with the film spool. The driver disk 40 thereby rotates independently of the flex disk 42, which does not move. Thus, the indicator tab 32 does not move and the indicated film exposure status does not change. This condition is illustrated in FIG. 4, which shows the indicator tab 32 engaged with one of the windows 30 and the drive pin 50 released from engagement with the driver disk drive feature 52.

If, however, the indicator tab 32 is pressed out of engagement with the film status windows 30, then the flex disk feature 49 will be flexed axially toward the driver disk 40 sufficiently so that the drive pin 50 is moved to a position where it can contact the driver feature 52. Under such conditions, the drive pin interferes with passage of the driver feature as the driver disk rotates with the film spool 34. The driver feature thereby pushes against the drive pin and therefore the flex disk 42 rotates with the driver disk 40 until the indicator tab 32 can engage with another one of the film status windows 30. It should be apparent that any camera that will change the indicated film exposure status must have a mechanism for engaging and disengaging the indicator tab 32 from the film status windows 30.

Figure 6:
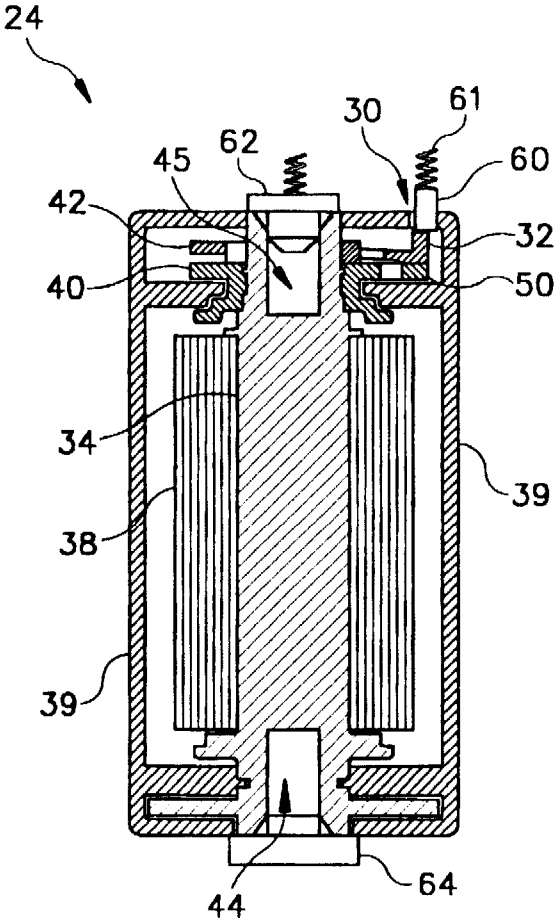
FIG. 6 is a cross-sectional view of the film cassette of FIG. 3 when installed in a non-MRI camera with the loading chamber cover closed.

As noted above, in a non-MRI camera, the partially exposed icon 28b is not used. Therefore, if the camera 12 does not provide the MRI feature, then it will include a release pin that prevents the indicator tab 32 from extending into the window 30 for the partially exposed icon 28b. FIG. 6 is a cross sectional illustration of the film cassette 24 in the non-MRI camera, in which a release pin 60 of the camera is shown extending into the window 30 for the partially exposed icon 28b illustrated in FIG. 3. The release pin is biased by a spring 61 of the camera so that the pin extends into the film status window when the film cassette is loaded and thereby prevents indication of the partially exposed status. That is, the release pin 60 is located in the camera such that it is aligned with the appropriate film status window. A spring loaded idler pin 62 of the camera 12 is shown extending into the idler socket 45 of the film spool 34 to help locate the film spool and cassette properly in the camera loading chamber. The opposite end of the film spool is shown engaged with a camera driving pin 64 that is keyed to engage the film spool and rotate it.

Figure 7:
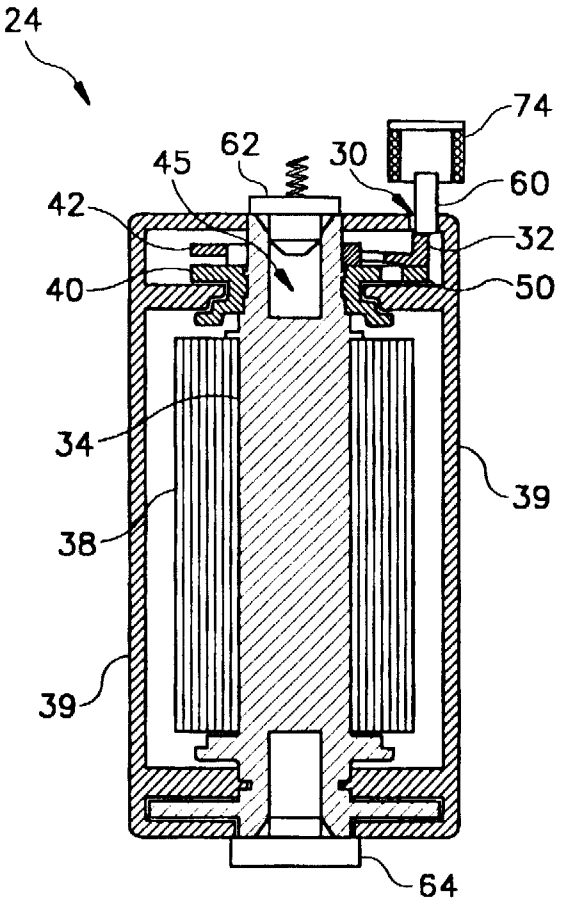
FIG. 7 is a cross-sectional view of the film cassette of FIG. 3 when installed in a MRI-capable camera with the loading chamber cover closed.

In general, if the camera 12 is to control the film exposure status indicated by the indicator tab 32, then the camera must have the ability to selectively press the indicator tab out of the various indicator windows 30 of the film cassette 24. FIG. 7 is a cross sectional representation of the film cassette 24 located in such an MRI camera, in accordance with the preferred embodiment FIG. 7 shows a movable release pin 60 that can be selectively actuated to move into and out of the film status window 30. Only one of a plurality of moveable release pins is illustrated in FIG. 7 for simplicity of illustration, but it should be understood that the camera 12 includes a similar release pin mechanism for each of the film status windows 30 of the film cassette 24.

When a particular exposure status of the film is to be indicated, the release pin corresponding to the window of the appropriate icon 28 is retracted so that the indicator tab 32 can extend into the corresponding window and indicate the desired status (as illustrated in FIG. 4). All other release pins will be extended as illustrated in FIG. 7 so as to prevent the indicator tab from entering into their respective windows. FIG. 7 shows that the movable release pin 60 is moved by a solenoid actuator 74 to press the indicator tab 32 into and out of engagement with the film status window 30 and move the drive pin 50 downwardly so that it can contact the driver feature 52 of the driver disk 40. Thus, unlike the pin of FIG. 6 that was continuously urged by the spring 61, the pin of FIG. 7 is selectively moved back and forth by a solenoid actuator. The solenoid actuator typically comprises a magnetic coil that can move the pin 60 into the film status window 30 with an energizing current. Reversing the polarity of the current serves to retract the piston back into the coil. Other schemes for providing a release pin and its necessary movement to control the indicator tab will occur those skilled in the art.

Figure 8:
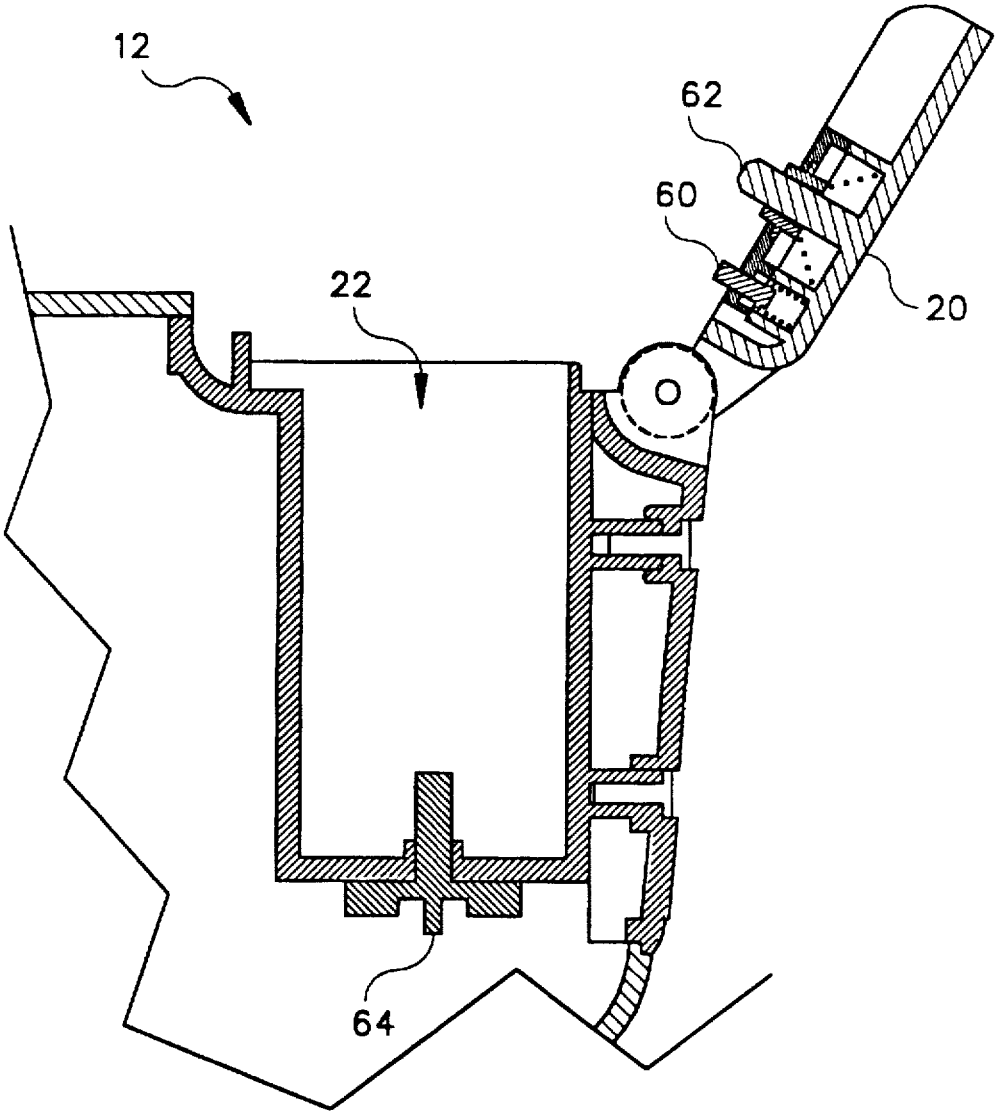
FIG. 8 is a cross-sectional view of a portion of the camera illustrated in FIGS. 1 and 2 showing the loading chamber cover open.
Figure 9:
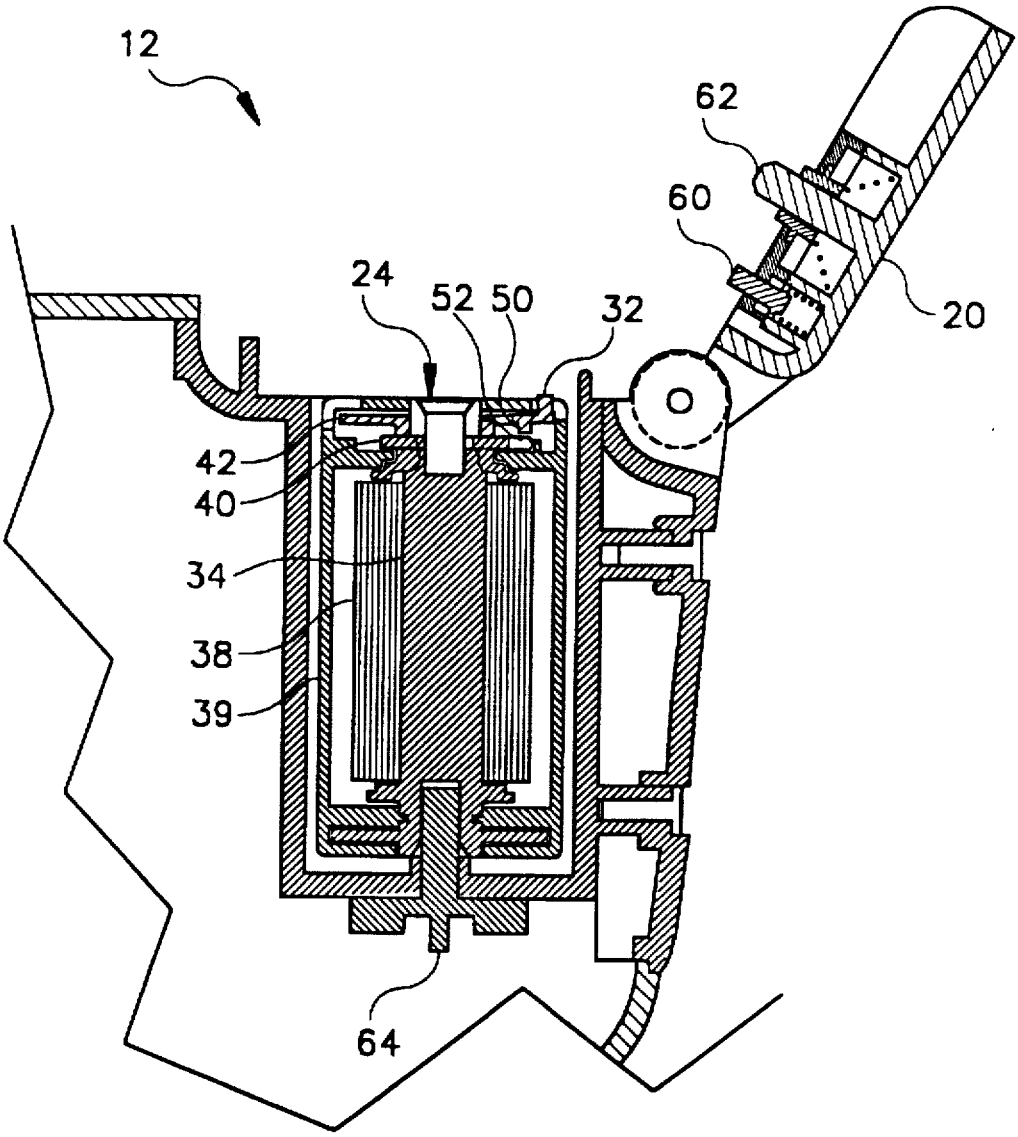
FIG. 9 is a cross-sectional view of the camera illustrated in FIG. 5 after a film cassette has been inserted into the camera, with the loading chamber cover open.
Figure 10:
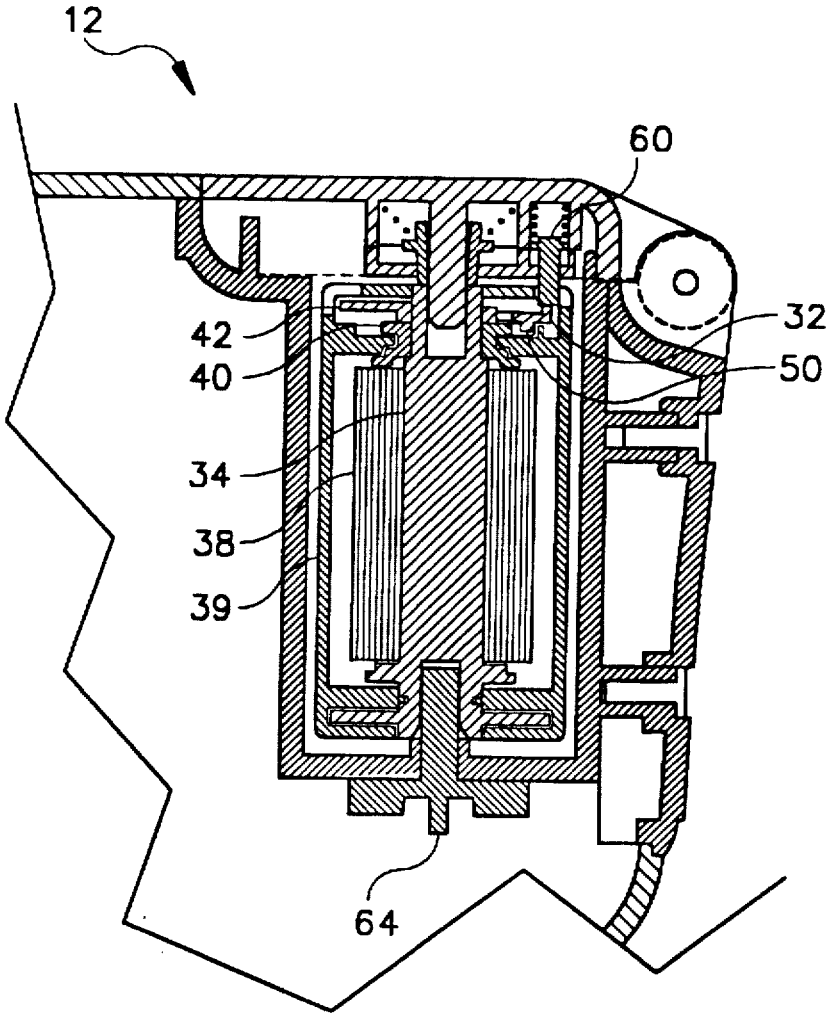
FIG. 10 is a cross-sectional view of the camera illustrated in FIG. 9 after the loading chamber cover is closed.

In the preferred embodiment, the release pins are contained in the loading chamber cover FIG. 8 is a cross sectional illustration of the camera 12 with the loading chamber cover 20 in the open position. A film driving pin 64 is shown extending into the loading chamber 22 and the idler pin 62 is shown extending from the chamber cover into the loading chamber. FIG. 9 shows the camera after the film cassette 24 has been loaded into the loading chamber. FIG. 9 illustrates the coupling or the driving pin 64 into the film spool 34. Next, FIG. 10 shows the loading chamber cover 20 in the closed position. FIG. 10 illustrates the engagement of the idler pin with the film spool and the engagement of the release pin 60 with the indicator tab 32 of the flex disk 42. As noted above, the camera includes a controller that moves the various release pins appropriately to indicate the appropriate film status.

Figure 11:
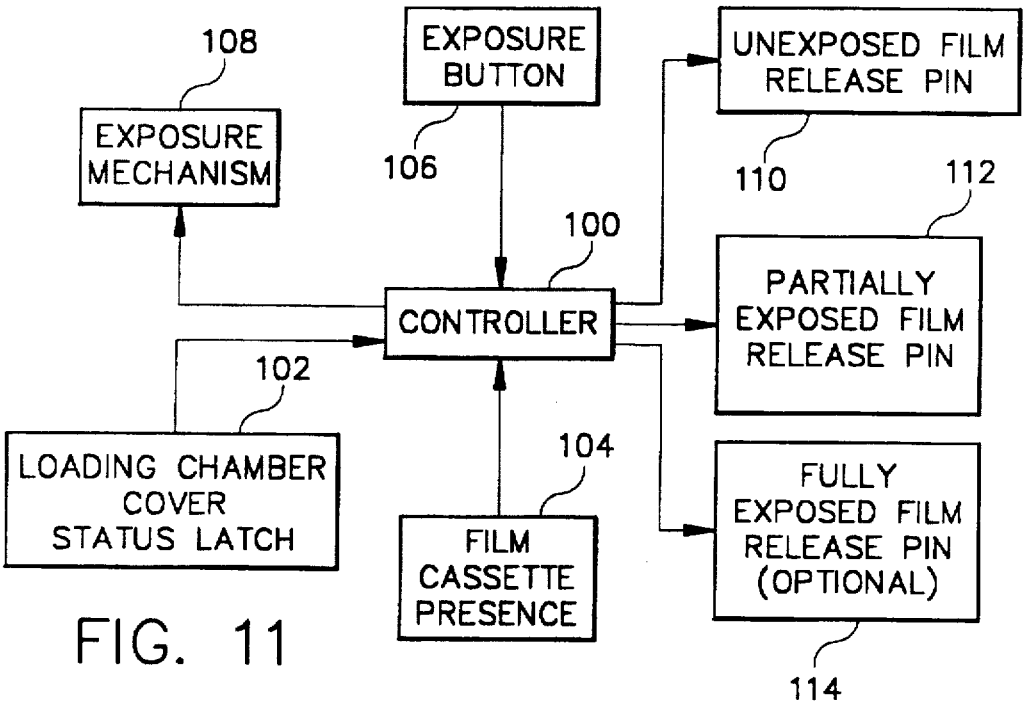
FIG. 11 is a block diagram of the camera illustrated in FIGS. 1 and 2.

FIG. 11 is a block diagram of the MRI-equipped camera of the preferred embodiment A camera controller 100 receives information concerning the loading chamber cover status from a loading chamber cover status latch 102. The controller also receives information concerning the presence of a film cassette in the loading chamber from a presence sensor 104. Preferably, the presence sensor also provides an indication of the film speed, film type, and number of exposure frames of the film cassette. Such information can easily be provided, for example, by magnetically encoded or optically encoded data placed on the exterior of the film cassette. A camera user initiates making a frame exposure by pressing an exposure button 106, also referred to as the shutter button. In response to the pressing, the controller 100 activates an exposure mechanism 108 that includes the camera shutter, diaphragm, and (typically) an electronic flash.

The camera controller 100 also controls the various release pins that engage and disengage the indicator tab with the status windows. As illustrated in FIG. 11, the controller so of the preferred embodiment has control of an "unexposed film" release pin 110 and a "partially exposed film" release pin 112. The camera optionally may have control of a "fully exposed film" release pin 114. More particularly, the camera controller has knowledge of the number of exposures on the film cassette and whether the film cassette is loaded and the chamber cover closed, and keeps track of the number of exposures initiated by the user through the exposure button 106. In this way, the controller determines the exposure status of the film and also determines which release pins might appropriately be extended or retracted.

Thus, when the first fame of the film cassette is exposed, the controller 100 extends the "unexposed film" release pin 110 so that the indicator tab can move from the unexposed icon 28a that it initially indicated to the next indicating window. In the case of a non-MRI camera, the partially exposed icon 28b is not used and therefore the controller in a non-MRI camera would always extend the "partially exposed film" release pin 112. Altenatively, the non-MRI camera could have a spring-loaded release pin such as illustrated in FIG. 5, simplifying the controller operation.

As noted above in connection with the tab changing schemes, after the first frame of the film cassette is exposed in an MRI-equipped camera, the controller 100 can automatically change the indicated exposure status from the initial unexposed status to the partially exposed status. The controller achieves this by activating the "unexposed film" release pin 110. In this way, if the camera user invokes the MRI feature, the indicator tab is in the correct position and does not have to be moved. The alternative tab changing scheme descried above involves the controller 100 activating both the "unexposed film" release pin 110 and the "partially exposed film" release pin 112 to permit the indicator tab to move to the fully exposed status window. Thereafter, if the MRI feature is invoked then the controller activates the otherwise optional "fully exposed film" release pin 114 to permit the indicator tab to back up as the film is rewound and engage the partially exposed film status window.

Under the first tab changing scheme described above, only two controllable release pins 110, 112 are needed but under the second tab changing scheme, three controllable release pins 110, 112, 114 are needed. This is because, under the first tab changing scheme, the indicator tab never has to move from the filly exposed film position back to the partially exposed film position. The indicator tab simply moves forward by one status window as the exposure status a changes. In contrast, under the second tab changing scheme, the indicator tab must potentially move from the fully exposed film position back to the partially exposed film position and then to the fully exposed position.

If the MRI camera implements the first described tab changing scheme, then when the controller 100 exposes the last frame of the film cassette, the controller causes the "partially exposed film" release pin 112 to be extended. This permits the indicator tab to move as the controller advances the film, thereby moving the indicator tab into the corresponding film status window. It should be understood that when the camera user has taken the filly exposed film cassette to a film processor, the film processor will develop the film and leave it in the film cassette with the indicator tab extending into the processed release pin window. Proper indication of the processed status can be implemented by placing the film cassette in an appropriate cassette handling mechanism. The exact nature of the mechanism can take many forms, which will occur to those skilled in the art. For example, the film processor could load the film cassette into a processor apparatus and control a "processed film" release pin that permits movement of the tab into the last indicator window for indicating the fully processed condition. It should be apparent that there is no need for the camera to include such a release pin. Preferably, the film exposure status also is detected by the camera from the film cassette or is indicated on an external film cassette encoding mechanism detectable by the camera.

Figure 12:
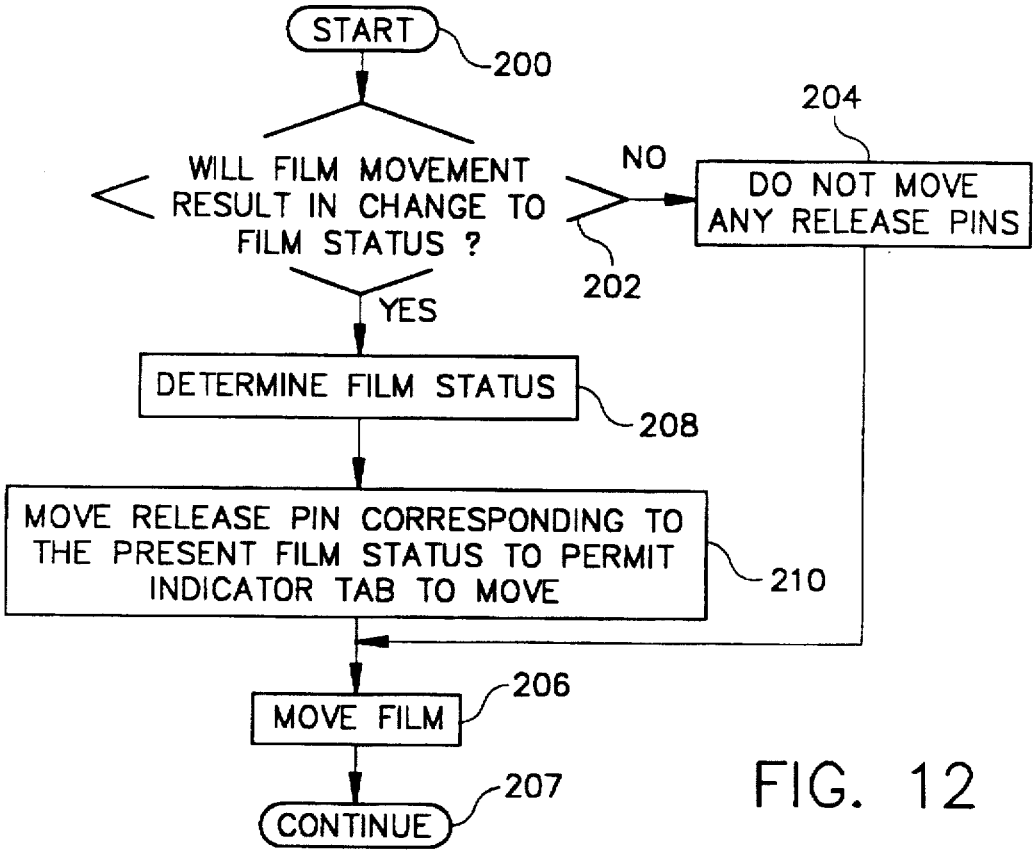
FIG. 12 is a flow diagram illustrating the operating steps followed by the camera controller of the camera illustrated in FIGS. 1 and 2.

FIG. 12 is a flow diagram that presents the processing steps followed by the camera controller of the preferred embodiment in controlling the actuation of the moveable release pins. At the start of the release pin actuation determining process, the controller checks to see if the film movement to be initiated by a pressing of the shutter button will result in a change to the film exposure status, as indicated by the decision box numbered 202. If the film movement will not result in a change to the film exposure status, then the controller does not need to move any release pins, as indicated by the flow diagram box numbered 204. The controller processing then moves the film, as indicated by the flow diagram box numbered 206, and continues (at box 207) to await the next shutter button activation and start the checking for a film status change at the decision box numbered 202.

If the film movement will result in a change to the film exposure status, an affirmative outcome at the decision box numbered 202, then the controller will next determine what the new film status is, as indicated by the flow diagram box numbered 208. For example, as described above, when the camera receives a fresh cassette, this step comprises determining whether the status upon loading will change from "unexposed film" to "partially exposed film" or "fully exposed film". The new status will depend on the MRI or non-MRI capability of the camera and on the tab changing scheme employed.

If the camera receives a cassette with a "partially exposed film" status, this step (flow diagram box 208) comprises the camera determining the next available unused frame and advancing the film to that predetermined point. The camera will then determine if the status will change from partially exposed to fully exposed or will remain unchanged, in accordance with the number of frames remaining in the cassette. Generally, the status determination occurs upon pressing of the shutter button. Thus, at the last frame of a film cassette, it might be necessary to move the film forward sufficiently to change the indicated status from "partially exposed film" to "fully exposed film", in accordance with the tab changing scheme.

After the new film status is determined, the film controller will cause the release pin for the current status to be extended, as represented by the flow diagram box numbered 210. This action permits the indicator tab to engage the next (appropriate) film status window. It should be understood that the movable release pins can be biased to remain extended at all times or can be biased to remain retracted, as desired. Solenoid actuation, for example, could provide the pin action that permits indicator tab movement. The processed film icon 28d will never be used by a camera and therefore the release pin corresponding to the processed film window can, if desired, be provided with a spring loading so that it always is extended into the window.

Assuming the film exposure status has changed and the appropriate release pin for the new status has been retracted, the controller moves the film in the film cassette, as represented by the flow diagram box numbered 206. Movement of the film causes rotation of the driver disk and flex disk, thereby moving the indicator tab to the appropriate window where the retracted release pin permits the indicator tab to become engaged. Processing then, once again, returns to the start of the routine where the controller waits for the next change in film status. As noted above, if there is no change in film exposure status, then none of the release pins are extended and the driver disk rotates independently of the flex disk, keeping the indicated film exposure status constant.

Thus, the film cassette described above includes a driver disk coupled directly to the cassette film spool and a flex disk with an indicator tab whose position relative to a window of the film cassette indicates the film exposure status. The cassette is advantageously used with a camera that changes the position of the indicator tab when the film spool is rotated upon film movement by engaging the flex disk and the driver disk. The film status indicator tab otherwise does not engage the driver disk and does not change position. Thus, the exposure status of the film is visually indicated by the film cassette without complicated film park mechanisms. An MRI-equipped camera has at least one movable indicator release pin that moves the flex disk into and out of engagement with the drive disk and thereby selectively changes the position of the indicator tab. A camera controller determines the film status and controls the movement of the indicator release pin to change the position of the film status indicator tab in accordance with the film status. A non-MRI camera simply changes the film status from unexposed to fully exposed. Thus, the film cassette of the preferred embodiment can be used advantageously with both MRI-capable cameras and non-MRI cameras.

The present invention has been described above in terms of a presently preferred embodiment so that an understanding of the present invention can be conveyed. There are, however many configurations for visual film exposure indicating systems not specifically described herein, but with which the present invention is applicable. The present invention should therefore not be seen as limited to the particular embodiment described herein, but rather, it should be understood that the present invention has wide applicability with respect to visual film exposure indicating systems generally. All modification, variations, or equivalent arrangements that are within the scope of the attached claims therefore should be considered within the scope of the invention.

The following elements and their corresponding reference numerals are used in the drawings:

camera film cassette combination 10
camera 12
viewfinder 14
objective lens 16
electronic flash 18
loading chamber cover 20
loading chamber 22
film cassette 24
end plate 26
film exposure status icons 28
unexposed film icon 28a
partially exposed film icon 28b
fully exposed film icon 28c
processed film icon 28d
status indicator window 30
indicator tab 32
film spool 34
mechanical status window 36
photographic film 38
cassette body 39
driver disk 40
flex disk 42
drive socket 44
idler socket 45
film spool ledge 46
locating key 48
flex disk feature 49
drive pin 50
driver feature 52
release pin 60
spring 61 idler pin 62
film driving pin 64
solenoid actuator 74
camera controller 100
loading chamber cover status latch 102
film presence sensor 104
exposure button 106
exposure mechanism 108
unexposed film release pin 110
partially exposed film release pin 112
fully exposed film release pin 114

We claim:

1. A film cassette for use with a photographic camera in making exposures, the film cassette comprising:

a cassette body having a plurality of film status windows;

a film spool, contained within the cassette body, onto which is wound an elongated strip of film that is moved within the camera as exposures are made;

a driver disk that is directly coupled to the film spool;

a flex disk that can be urged into and out of engagement with the driver disk such that the flex disk rotates with the driver disk only when engaged with it; and a film status indicator whose position relative to the film status windows indicates the status of the film;

wherein movement of the film spool when the flex disk is engaged with the driver disk causes the flex disk to move and the position of the film status indicator relative to at least one of the film status windows to change, and movement of the film spool when the flex disk is not engaged with the driver disk causes no change in the relative position of the film status indicator.

2. A film cassette as defined in claim 1, wherein:

the flex disk includes a driver pin that can be coupled with the driver disk, thereby engaging the flex disk with the driver disk;

the film status indicator comprises an indicator pin on the flex disk that projects toward the film status windows, such that the indicator pin extends into a film status window and thereby indicates the status of the film and moves with the flex disk such that the indicator pin can be pressed out of a film status window and thereby couple the flex disk with the driver disk.

3. A film cassette as defined in claim 2, wherein the indicator pin is located on a surface of the flex disk directly opposite the driver pin.

4. A film cassette as defined in claim 1, wherein the film status indicator comprises a projection that extends outwardly from the flex disk such that the projection extends into a selected one of the film status windows to thereby indicate the film status associated with the film status window and can be moved from a current window through which the indicator extends to a next window only when the film status indicator is depressed from out of the current window.

5. A film cassette as defined in claim 4, wherein the film status indicator projection is pressed out of the current film exposure starts window by a release pin of the camera with which the film cassette is used.

6. A film cassette comprising:

a generally cylindrical container defining a cassette body having a volume;

an end plate that covers one end of the cassette body and includes a plurality of film exposure status notches that represent the film status as being one of either an unexposed, exposed, or processed condition;

a film spool, rotatably supported in the cassette body, on which an elongated roll of film can be wound such that unwinding the film causes the film spool to rotate;

a driver disk coupled directly to the film spool such that the driver disk rotates in response to rotation of the film spool, the driver disk further having a driver feature;

a flex disk that can be urged into and out of engagement with the driver disk such that the flex disk rotates with the driver disk only when engaged with it;

an indicator tab that can be moved into and out of engagement with one of the film exposure stats notches when the flex disk is rotated such that moving the indicator tab into engagement with one of the film exposure status notches urges the flex disk out of engagement with the driver disk and thereby halts rotation of the flex disk, thereby indicating the film status as being the condition represented by the film exposure status notch with which the indicator tab is engaged, and moving the indicator tab out of engagement urges the flex disk into engagement with the driver disk.

7. A film cassette as defined in claim 6, wherein the flex disk further includes a drive pin that engages the drive feature when the indicator tab is pressed out of engagement with one of the film exposure status notches and releases the drive feature when the indicator tab is engaged with one of the film exposure status notches to thereby permit the driver disk to rotate independently of the flex disk when the film spool is rotated.

8. A film cassette as defined in claim 6, wherein the film exposure status notches of the end plate represent the film status as being one of either an unexposed, partially exposed, fully exposed, or processed condition.

9. A film cassette as defined in claim 7, wherein:

the driver feature of the driver disk comprises a circumferential projection; and the flex disk is axially located between the driver disk and the end plate, the drive pin comprises a pin that projects toward the driver disk, and the indicator tab projects toward the end plate such that the drive pin makes contact with the driver feature of the driver disk when the indicator tab is pressed out of engagement with the film exposure status notches and the driver disk is rotated, thereby rotating the flex disk with the driver disk.

10. A film cassette as defined in claim 9, wherein the indicator tab is located on a surface of the flex disk directly opposite the drive pin.

11. A photographic camera comprising:

a camera body that receives a roll of film that is advanced as frames of the film are exposed;

a loading chamber in the camera body that receives a film cassette having a film exposure status indicator;

a loading chamber cover that moves to open the loading chamber and permit the film cassette to be received therein;

a movable indicator release that engages the film cassette and changes the status of the film exposure status indicator; and a controller that determines the film status and controls the movement of the movable indicator release to selectively change the status of the film exposure status indicator in accordance with the determined film status.

12. A photographic camera as defined in claim 11, wherein:

the movable indicator release comprises a plurality of pins that can be selectively moved to extend into any one of a plurality of film exposure status windows of the film cassette; and the controller moves the pin corresponding to the determined film status during a film movement into the selected film exposure status window, thereby changing the status of the film exposure status indicator, and does not move any other indicator release pin.

13. A photographic camera as defined in claim 12, wherein each pin extends into a different film exposure status indicator window of the film cassette when moved by the controller.

14. A photographic camera as defined in claim 13, wherein the movable indicator release pins are coupled to the loading chamber cover.

15. A photographic camera as defined in claim 11, wherein the movable indicator release changes the status of the film exposure status indicators to indicate the film status as being in either an unexposed, partially exposed, fully exposed, or processed condition.

16. A photographic camera comprising:

a camera body;

a loading chamber in the camera body that receives a film cassette having a roll of film that is moved as frames of the film are exposed and further having a plurality of film exposure status indicators that indicate the film status as being in one of a plurality of conditions;

a loading chamber cover that moves to open the loading chamber and permit the film cassette to be received;

at least one indicator release pin that moves to engage the film cassette and change the condition of the film exposure status indicators when the roll of film is moved; and a controller that determines the film status and controls the advancement of the roll of film and the movement of the indicator release pin to engage the film cassette and thereby change the status of the film exposure status indicators in accordance with the determined film status.

17. A photographic camera as defined in claim 16, wherein:

the camera includes a plurality of indicator release pins such that a separate pin is provided for each film exposure status indicator of the film cassette; and the controller moves only the indicator release pins necessary to indicate the determined film status and does not move any other indicator release pins.

18. A photographic camera as defined in claim 16, wherein the camera includes an indicator release pin that permits changing the condition of an "unexposed film" exposure status indicator and a "partially exposed film" exposure status indicator.

19. A photographic camera as defined in claim 16, wherein:

the film exposure status indicators comprise a plurality of status windows in the cassette, each of which receives an indicator pin that thereby indicates the film exposure status as corresponding to the receiving status window; and each indicator release pin engages a different status window when moved by the controller.

20. A photographic camera as defined in claim 16, wherein the movable indicator release pins are coupled to the loading chamber cover.

21. A photographic camera as defined in claim 16, wherein the movable indicator release pins correspond to status windows representing one of either an unexposed, partially exposed, fully exposed, or processed condition.

22. A photographic combination comprising:

a film cassette having a cassette body having a plurality of film status windows, a film spool, contained within the cassette body, onto which is wound an elongated strip of film, a driver disk that is directly coupled to the film spool;

an indicator flex disk having a film status indicator whose position relative to the film status windows Indicates the status of the film, wherein the flex disk can be engaged and disengaged with the driver disk such that movement of the film spool when the flex disk is engaged with the driver disk causes the position of the film status indicator relative to at least one of the film status windows to change and such that movement of the film spool otherwise causes no change in the relative position of the film status indicator, and a photographic camera having a camera body, a loading chamber in the camera body that receives the film cassette, a loading chamber cover that moves to open the loading chamber and permit the film cassette to be received therein, a movable indicator release that engages the film cassette and changes the status of the film status indicator relative to the film status windows, and a camera controller that causes film exposures to be made as the film in the cassette is moved, determines the film status, and controls the movement of the movable indicator release to selectively change the status of the film status indicator in accordance with the film status.

23. A photographic combination as defined in claim 22, wherein the camera controller provides a mid-roll interrupt function that automatically rewinds the film into the film cassette for cassette removal and then, upon loading the film cassette back into the loading chamber, automatically moves the film to the next available unexposed frame.

24. A method of operating a camera to indicate the film exposure status of a film cassette having a movable indicator tab that is moved to a cassette film status window that indicates the film exposure status, which changes as the film is moved in the camera, the method comprising the steps of:

providing a movable camera release pin for each film status window from which the indicator tab will be moved;

determining what the film exposure status will be after a pending film movement is completed;

moving an indicator tab release pin corresponding to the current film exposure status if the film exposure status will be changed after the pending film movement is completed and maintaining all movable release pins in their present position if the film exposure status is not changed; and completing the film movement and automatically simultaneously changing the indicated film status.

25. A method as defined in claim 24, further including the steps of:

receiving a film cassette containing photographic film and having a film status window and indicator tab condition that indicates a status of "unexposed film"; and advancing the film to an initial frame position and changing the condition of the film status window and indicator tab to indicate a status of "partially exposed film".

26. A method as defined in claim 25, further including the steps of: invoking a mid-roll interrupt feature; and rewinding the film to a predetermined position to permit removal of the film cassette from the camera without exposing the film.

27. A method as defined in claim 26, further including the steps of:

receiving a film cassette containing photographic film and having a film status window and indicator tab condition that indicates a status of "partially exposed film"; and advancing the film to a last exposed frame position without changing the condition of the film status window and indicator tab.

28. A method as defined in claim 24, further including the steps of:

receiving a film cassette containing photographic film and having a film status window and indicator tab condition that indicates a status of "unexposed film"; and advancing the film to an initial frame position and changing the condition of the film status window and indicator tab to indicate a status of "fully exposed film".

29. A method as defined in claim 28, further including the steps of:

invoking a mid-roll interrupt feature; and rewinding the film to a predetermined position to permit removal of the film cassette from the camera without exposing the film and changing the condition of the film stats window and indicator tab to indicate a status of "partially exposed film".

30. A method as defined in claim 29, further including the steps of:

receiving a film cassette containing photographic film and having a film status window and indicator tab condition is that indicates a status of "partially exposed film"; and advancing the film to a last exposed frame position and changing the condition of the film status window and indicator tab to indicate a status of "fully exposed film".

*31. A film cassette comprising:*

*a cassette body having a film status window;*

*a film spool contained within the cassette body;*

*a driver disk that is directly coupled to the film spool;*

*a flex disk that can be engaged and not engaged with the driver disk such that the flex disk rotates with the driver disk only when engaged with it; and*

*a film status indicator whose position relative to the film status window indicates the status of film;*

*wherein movement of the film when the flex disk is engaged with the driver disk causes the flex disk to move and the position of the film status indicator relative to the film status window to change, and movement of the film spool when the flex disk is not engaged with the driver disk causes no change in the relative position of the film status indicator.*

*32. A film cassette comprising:*

*a generally cylindrical container defining a cassette body having a volume;*

*an end plate that covers one end of the cassette body and includes a film exposure status notch that represents the film status as being an exposed condition;*

*a film spool, rotatably supported in the cassette body, on which an elongated roll of film can be wound such that unwinding the film causes the film spool to rotate;*

*a driver disk coupled directly to the film spool such that the driver disk rotates in response to rotation of the film spool, the driver disk further having a driver feature;*

*a flex disk that can be engaged and not engaged with the driver disk such that the flex disk rotates with the driver disk only when engaged with it; and*

*an indicator tab that can be moved into and out of engagement with the film exposure status notch when the flex disk is rotated such that moving the indicator tab into engagement with the film exposure status notch urges the flex disk out of engagement with the driver disk and thereby halts rotation of the flex disk and indicates an exposed condition.*

* * * * *